Patented Aug. 3, 1937

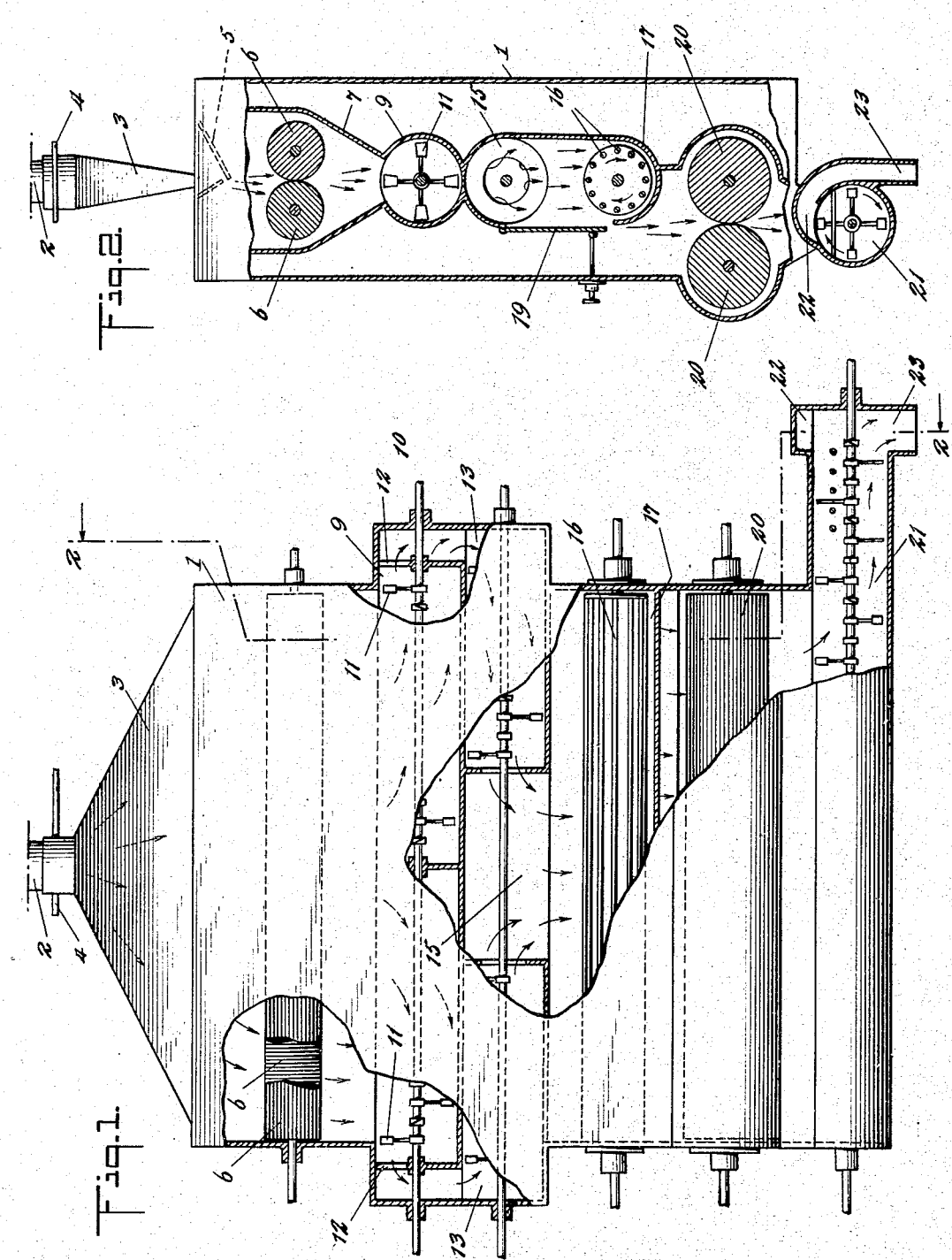

2,089,065

UNITED STATES PATENT OFFICE 2,089,065

METHOD AND APPARATUS FOR PREPARING COFFEE, ETC.

Payson MacKaye, Yonkers, N. Y., assignor to Jabez Burns & Sons, Inc., New York, N. Y., a corporation of New York Application February 11, 1933, Serial No. 656,211

7 Claims. (Cl. 83—12)

The present invention consists of an improved method and apparatus for comminuting the natural chaff in roasted coffee, distributing it evenly through the ground product, rendering it invisible, and preventing its subsequent separation or stratification in containers.

Within every coffee bean there is curled a large flake of light-colored chaff, which remains after the berry is roasted and is only released in the course of the grinding process.

Existing means of grinding coffee to a proper fineness for ordinary brewing methods divide these chaff flakes into relatively large pieces. Such particles are unsightly in the product and objectionable because they tend to separate and stratify in containers.

In the past, it has been a common practice permanently to remove the chaff from high-grade granulated coffees by air suction devices. This proved undesirable because, 1. A considerable shrinkage in weight was caused by the loss of chaff (and some coffee particles, carried away by the air draft).
2. Absence of the chaff adversely affected the infusion quality of the ground product.
3. The air draft carried away a part of the coffee aroma and tended to hasten staleness in the product by excessive exposure to atmospheric oxygen.
4. The chaff-removal apparatus materially increased the cost of grinding equipment and its operation.

More recently the shrinkage has been overcome and infusion quality improved by grinding the chaff separately and remixing it with the ground coffee in normal proportions. However, this does not eliminate the detrimental effect of the air draft, or reduce the cost of equipment and operation.

Also, attempts have been made to do away with the expensive separating system by allowing the chaff flakes to remain in the coffee until the grinding operation is completed, and then beating the ground coffee and chaff together in a mixing chamber. When such beating is sufficient to reduce the chaff, the heat produced is noticeably detrimental to the coffee and the exposure to atmospheric oxygen is even greater than in the suction separators.

The present invention eliminates all objectionable features incident to the satisfactory reduction of chaff in grinding coffee. There is no shrinkage in weight. The chaff is invisible, evenly distributed and does not separate. The product has maximum protection from atmospheric oxygen, there is no danger of overheating, and the apparatus is simple and inexpensive.

Briefly, the method consists in cracking the roasted coffee beans into relatively large pieces, so that the chaff flakes are liberated. The cracked coffee and chaff then pass into an enclosed mixing chamber, fitted with revolving arms or flanges. The flow is regulated so that the chamber is approximately full of cracked coffee at all times within its efficient operating capacity, and the revolving members are turned at a speed low enough to prevent any objectionable generation of heat. The mixer is preferably of a continuous type.

During this mixing operation the chaff is reduced by the grinding action of the relatively heavy or bulky sharp-edged coffee particles. The reduced chaff is uniformly mixed through the mass of coffee. It is stained to coffee color by the minute quantity of coffee oils liberated in the cracking process; and the same oily film causes powdered chaff particles to adhere to the coffee granules.

After the chaff has been satisfactorily disposed of by the grinding action of the cracked coffee, the product is discharged from the mixer and further reduced to the finished fineness, by any suitable means.

A preferred type of apparatus for processing the coffee and chaff by this method is illustrated by the accompanying drawing, wherein, Fig. 1 is an elevation, partly in section, of a suitable apparatus.

Fig. 2 is a vertical section on line 2—2 of Fig. 1.

While the process above described has been carried on successfully with this apparatus, the present invention is not limited by it, as any means may be employed which serves to reduce the chaff by the grinding action of cracked coffee particles.

1 is a casing to exclude air, having a feed hopper 2 at the top for the roasted beans, controlled by a gate 4. 5 is a distributer within the casing 1 to evenly feed the beans to cracking rolls 6—6, one of which is adjustable relatively to the other by well known pivoted or sliding spring pressed means, not shown, to control the spacing, and also yielding to pass any large hard object, such as a stone, nail, etc. As seen in Fig. 1, one roll is circumferentially grooved, and the other is longitudinally grooved, and one may run faster than the other according to common practice. The grooves are preferably about 10 to the inch of 60° V type with rounded bottoms. The rolls 6 are in a casing 7 which discharges the cracked goods into a chaff reducer and mixer or muller 9. This reducer and mixer 9 contains a shaft 10 carrying arms or vanes 11 set to both slowly mix and feed the coffee to elevated end discharges 12, 12, while reducing the chaff. The rate is such as to practically keep the mixer and reducer 9 filled with goods within its efficient operating capacity. As herein shown in order to save space, while still retaining the necessary length properly to finish the chaff without overheating by too high speed of the vanes 11, further travel is provided by mixers and reducers 13, 13, containing vanes 14, 14, which discharge at 15, to a squirrel cage distributer 16 in trough 17, for evenly distributing and feeding the goods through adjustable gate 19 and thence to the finish cutting rolls 20, 20, constructed and driven similarly to cracking rolls 6, but usually with finer grooves, as 18 to the inch, and set closer together, varying in cut and set according to the fineness of the finished cut desired. From the finishing rolls the goods drop into a final conveyer 21, having an elevated discharge 22 for compacting and uniformly mixing the goods before discharging from pipe 23 into a bin or barrel. The compacting effect is of advantage in further reducing any remaining tendency of chaff and coffee to separate and in delivering the product in a homogeneous condition.

Suitable means not shown are provided for driving the various parts.

While I have preferably shown and claim cutting rolls for both cracking and finishing, I do not restrict myself thereto within the broad scope of my invention, as I may use for cracking a plate mill, or roll and concave or convex bar; and for finishing may use a plate mill or other suitable means. I therefore do not limit myself except as required by the scope of the appended claims.

The invention claimed is:

1. Method of preparing coffee comprising cracking roasted coffee beans sufficiently to free the chaff and provide relatively large and sharp coffee granules, agitating the mixture to reduce and coat the chaff, reducing the granules to finished size, and then uniformly mixing the granules and chaff.

2. A method of treating roasted coffee beans, which includes the following steps: first coarse-granulating the coffee beans, second working the coarse-granulated coffee to pulverize the commingled chaff, third finish-granulating the product, and fourth mixing the product to insure a homogeneous mixture and the burnishing of the facets of the individual coffee granules.

3. A method of treating roasted coffee beans, including the following steps: first coarse-granulating the coffee beans, second working the coarse-granulated coffee to pulverize the commingled chaff, and third finish-granulating the product.

4. A method of treating roasted coffee beans, which includes the following steps: first coarse-granulating the coffee beans, second pulverizing the commingled chaff by working the coarse-granulated coffee within an enclosed container from which substantially all of the air may be maintained displaced by keeping the container substantially filled with the granulated coffee, and third finish-granulating the product.

5. A method of treating roasted coffee beans, including the following steps: first coarse-granulating the coffee beans, second pulverizing the commingled chaff by working the coarse-granulated coffee within an inclosed container from which substantially all of the air is maintained displaced, and third finish-granulating the product.

6. In a mill for treating roasted coffee beans, the combination of means for coarse-granulating the coffee beans, an inclosed muller from which substantially all of the air is maintained displaced for treating the product to pulverize the commingled chaff, means for finish-granulating the mulled coffee, and mixing means operable for stirring the product to insure a homogeneous mixture and to burnish the facets of the individual coffee granules.

7. In a mill for treating roasted coffee beans, the combination of means for coarse-granulating the coffee beans, a muller operable for treating the product to pulverize the commingled chaff, means for finish-granulating the mulled coffee, and mixing means operable for stirring the product to insure a homogeneous mixture and to burnish the facets of the individual coffee granules.

PAYSON MACKAYE.